(12) United States Patent
Gardner et al.

(10) Patent No.: US 10,894,353 B2
(45) Date of Patent: Jan. 19, 2021

(54) DEVICES AND METHODS FOR ADDITIVE MANUFACTURING USING FLEXIBLE FILAMENTS

(71) Applicant: U.S.A. as represented by the Administrator of the National Aeronautics and Space Administration, Washington, DC (US)

(72) Inventors: John M. Gardner, Newport News, VA (US); Christopher J. Stelter, Newport News, VA (US); Katherine A. Fotion, Monte Sereno, CA (US); Jae-Woo Kim, Newport News, VA (US); Godfrey Sauti, Hampton, VA (US); Emilie J. Siochi, Newport News, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 212 days.

(21) Appl. No.: 15/347,020

(22) Filed: Nov. 9, 2016

(65) Prior Publication Data

US 2017/0129171 A1    May 11, 2017

Related U.S. Application Data

(60) Provisional application No. 62/294,499, filed on Feb. 12, 2016, provisional application No. 62/252,825, filed on Nov. 9, 2015.

(51) Int. Cl.
*B29C 64/118* (2017.01)
*B33Y 10/00* (2015.01)
(Continued)

(52) U.S. Cl.
CPC ............ *B29C 64/118* (2017.08); *B33Y 10/00* (2014.12); *B33Y 50/02* (2014.12); *B29K 2105/16* (2013.01)

(58) Field of Classification Search
CPC ....... B29C 64/153; B29C 64/25; B29C 64/35; B29C 64/364; B29C 64/371; B33Y 10/00; B33Y 50/02
See application file for complete search history.

(56) References Cited

U.S. PATENT DOCUMENTS 2,356,841 A    8/1944  Gregory
2,544,673 A    3/1951  Bernard
(Continued)

OTHER PUBLICATIONS

Thermoset Resin UNSW article (Year: 2013).*
(Continued)

*Primary Examiner* — Peter L Vajda
*Assistant Examiner* — S. Behrooz Ghorishi
(74) *Attorney, Agent, or Firm* — Jennifer L. Riley; Rabin W. Edwards; Helen M. Gaius

(57) ABSTRACT

A method of fabricating (printing) parts utilizing flexible filaments includes anchoring a portion of a flexible filament to a substrate. A length of flexible filament is extended over the substrate while the flexible filament is in tension to thereby avoid buckling of the flexible filament. The flexible filament may comprise a thermoplastic material and fibers or other reinforcing materials whereby composite 3D parts can be fabricated.

19 Claims, 7 Drawing Sheets

(51) Int. Cl.
*B33Y 50/02* (2015.01)
*B29K 105/16* (2006.01)

(56) References Cited

U.S. PATENT DOCUMENTS

| | | | |
|---|---|---|---|
| 2,821,253 A | 1/1958 | Heffelfinger | |
| 2,871,622 A | 2/1959 | Edward et al. | |
| 3,763,561 A | 10/1973 | Scharfenberger | |
| 4,169,398 A | 10/1979 | Wadsworth et al. | |
| 4,248,114 A | 2/1981 | Alexander et al. | |
| 4,557,049 A | 12/1985 | Cribbs et al. | |
| 4,984,727 A | 1/1991 | Jimenez | |
| 5,044,235 A | 9/1991 | Lehner | |
| 5,121,329 A | 6/1992 | Crump | |
| 5,176,028 A | 1/1993 | Humphrey | |
| 5,448,186 A | 9/1995 | Kawata | |
| 5,500,505 A | 3/1996 | Jones | |
| 5,873,291 A | 2/1999 | Sand | |
| 6,282,950 B1 | 9/2001 | Taylor, Jr. | |
| 6,518,330 B2 | 2/2003 | White et al. | |
| 6,735,870 B2 | 5/2004 | Sand | |
| 6,934,600 B2 * | 8/2005 | Jang | B82Y 30/00 264/109 |
| 7,137,761 B2 | 11/2006 | Hara et al. | |
| 7,297,304 B2 | 11/2007 | Swanson et al. | |
| 7,799,849 B2 | 9/2010 | Raravikar et al. | |
| 8,221,669 B2 | 7/2012 | Batchelder | |
| 8,347,723 B2 | 1/2013 | Questo et al. | |
| 8,452,073 B2 | 5/2013 | Taminger et al. | |
| 9,126,367 B1 * | 9/2015 | Mark | B29C 70/20 |
| 2009/0294022 A1 | 12/2009 | Hayes et al. | |
| 2012/0036977 A1 | 2/2012 | Vaniglia | |
| 2013/0233471 A1 | 9/2013 | Kappesser et al. | |
| 2013/0255084 A1 | 10/2013 | Hasegawa et al. | |
| 2014/0061974 A1 | 3/2014 | Tyler | |
| 2014/0249773 A1 | 9/2014 | Beuth, Jr. | |
| 2014/0268604 A1 | 9/2014 | Wicker et al. | |
| 2014/0291886 A1 | 10/2014 | Mark et al. | |
| 2015/0044383 A1 | 2/2015 | Kim | |
| 2015/0108677 A1 | 4/2015 | Mark et al. | |
| 2018/0201021 A1 * | 7/2018 | Beaver | B33Y 40/00 |

OTHER PUBLICATIONS

Iijima, Sumio, "Helical Microtubules of Graphitic Carbon", Letter to Nature, Nov. 7, 1991, pp. 56-58, vol. 354.
Dresselhaus, Mildred S. et al., Carbon Nanotubes Synthesis, Structures, Properties and Applications (T. W. Ebbesen, Ed. 1991), Chapter 2, Relation of Carbon Nanotubes to Other Carbon Materials, Graphite p. 14; Chapter 3, Nanotube Growth and Characterization, p. 29 and Chapter 6, Electronic Properties and Defects, p. 116.
Koratkar, Nikhil A. et al., "Multifunctional Structural Reinforcement Featuring Carbon Nanotube Films", Compos. Sci. and Technol. (2003) pp. 1525-1531, vol. 63.
Atkinson, Ken R. et al., "Multifunctional Carbon Nanotube Yarns and Transparent Sheets: Fabrication, Properties, and Applications", Physica B (2007) pp. 339-343, vol. 394.
Qiu, Jingjing et al., "Carbon Nanotube Integrated Multifunctional Multiscale Composites", Nanotechnotogy (2007) pp. 1-11, vol. 18, 275708.
Kaemogebm M. et al., Multifunctional Carbon Nanotube Networks for Fuel Cells, Appl. Phys. Lett. (2008) pp. 094103-1-094103-3, vol. 92, 094103.
Lee, Woo II et al., Microwave Curing of Composites, J. Comps. Mater (1984) 387-409, vol. 18, Technomic Publishing Co.
Dresselhaus, M. S. et al., "Physics of Carbon Nanotubes", (1995) Carbon, pp. 883-891, vol. 33, No. 7.
Park, Cheol et al., "Dispersion of Single Wall Carbon Nanotubes by in Situ Polymerization Under Sonication", Chem. Phys. Lett. (2002) pp. 303-308, vol. 364.

Thostenson, E. T. et al., "Processing-structure-multi-functional Property Relationship in Carbon Nanotube/epoxy Composites", (2006) Carbon, pp. 3022-3029 vol. 44.
Ma, Peng-Cheng et al., "Dispersion and Functionalizarion of Carbon Nanotubes for Polymer-based Nanocomposites: A Review", Composites: Part A (2010) pp. 1345-1367, vol. 41.
De Volder, Michael F. L. et al, "Carbon Nanotubes: Present and Future Commercial Applications", Science (2013) pp. 535-539, vol. 339.
Gurau, Michael, "Part 2: The world's First Commericial All-CNT Sheets. Tape and Yarns", archived at http://www.nanocomptech.com/blog/need-to-know-part-2-sheets-tape-yarn, accessed Apr. 17, 2016.
Qunfeng, Cheng et al., "High mechanical performance composite conductor: multi-walled carbon nanotube sheet/bismaleimide nanocomposites", Adv. Funct. Mater. (2009) pp. 3219-3225, vol. 19.
Qunfeng, Cheng et al., "Functionalized Carbon-Nanotube Sheete/Bismaleimide Nanocomosites: Mechanical and Electrical Performance Beyond Carbon-Fiber Composites", Small (2010) pp. 763-767, vol. 6.
Kim, Jae-Woo et al., "Polyaniline/carbon Nanotube Sheet Nanocomposites: Fabrication and Characterization", ACS Appl. Mater. Interfaces (2013) pp. 8597-8606, vol. 5.
Kim, Jae-Woo et al., "Toward High Performance Thermoset/Carbon Nanotube Sheet Nanocomposites via Resistive Heating Assisted Infiltration and Cure", ACS Appl. Mater. Interfaces (2014) pp. 18832-18843, vol. 6.
Downs, Rebekah et al., "Strain-Induced Alignment Mechanisms of Carbon Nanotube Networks", Adv. Eng. Mater. (2015) pp. 349-358, vol. 17.
Harvey, Stefanie E., "Carbon as Conductor: A Pragmatic Review", Proceedings of the 61st IWCS Conference (2013) pp. 558-562.
Behantu, Natnael et al., "Strong, Light, Multifunctional Fibers of Carbon Nanotubes with Ultrahigh Conductivity", Science (2013) pp. 182-186, vol. 339.
Bak, David, "Rapid Prototyping or Rapid Production? 3D Printing Process Move Industry Towards the Latter", Assembly Automation (2003) pp. 340-345, vol. 23.
Jones, Rhys, et al., "ReRap-the Replicating Rapid. Prototyper", Robotica (2011) pp. 177-191, vol. 29.
Espalin, D. et al., "3D Printing Multifunctionality: Structures with Electronics", Int. J. Adv. Manuf. Technol, (2014) pp. 963-978, vol. 72.
Tymrak, B. M. et al,. "Mechanical Properties of Components Fabricated with Open-source 3-D Printers Under Realistic Environmental Conditions", Materials & Design (2014) pp. 242-246, vol. 58.
Garcia-Tunon, E. et al., "Printing in Three Dimensions with Graphene", Adv. Mater. (2015) pp. 1688-1693, vol. 27.
Kim, J. H. et al, 3D Printing of Reduced Graphene Oxide Nanowires, Adv. Mater. (2015) 157-161, vol. 27.
Nikzad, M. et al, "Thermo-mechanical Properties of a Highly Filled Polymeric Composites for Fused Deposition Modeling", Materiais & Design (2011) pp. 3448-3456, vol. 32.
Walker, Brett S et al., "Reactive Silver Inks for Patterning High-conductivity Features at Mild Temperatures", J. Am. Chem. Soc. (2012) pp. 1419-1421, vol. 134.
Campbell, Thomas A., et al., "The Next Wave: 4D Printing Programming the Material World", Brent Scoworoft Center on International Security Report, Atlantic Council (2014).
Meng, Fancheng et al., "Electro-Induced Mechanical and Thermal Responses of Carbon Nanotube Fibers", Adv. Mater. (2014) pp. 2480-2485, vol. 26.
Namiki, M. et al., "3D Printing of Continuous Fiber Reinforced Plastic", SAMPE Conf. Proc., (2014) pp. 59-4328.
Dresselhaus, M. S., Dresselhaus, G. and Saito, R., Pergamon "Physics of Carbon Nanotubes," Carbon, vol. 33, No. 7, pp. 883-891, (1995).
Hoogenboom, R. et al., "Miorowave-Assisted Polymer Synthesis: Recent Developments in a Rapidly Expanding Field of Research", Macromol. Rapid Commun., (2007) pp. 368-386, vol. 28.

(56) References Cited

OTHER PUBLICATIONS

Kumar, P. K. et al., "Development of Infrared rRadiation Curing System for Fiber Reinforced Polymer Composites: An Experimental Investigation", Indian J. Eng. Mater. Sci. (2011) pp. 24-30, vol. 18.

Levy, A. et al., "Ultrasonic Welding of Thermoplastic Composites: a Numerical Analysis at the Mesoscopic Scale Relating Processing Parameters, Flow of Polymer and Quality of Adhesion", Int. J. Mater. Form. (2014) pp. 39-51, vol. 7.

Bayerl, T. et al., "The Heating of Polymer Composites by Electromagnetic Induction—A review", Composites, Part A, pp. 27-40 (2014), vol. 57.

Kim, Jae-Woo et al., "Toward High Performance Thermoset/Carbon Nanotube Sheet Nanocomposites via Resistive Heating Assisted Infiltration and Cure", ACS Appl. Mater. Interfaces (2014) pp. 8832-18843. vol. 6.

Soylemez, Emrecan et al., "Controlling Melt Pool Dimensions Over a Wide Range of Material Deposition Rates in Electron Beam Additive Manufacturing", Solid Freeform Fabrication Conference (2010) pp. 571-582.

Vasinonta, Aditad et al., "Process Maps for predicting residual stress andmelt pool size in the laser-based fabrication of thin-walled structures," J. Manuf., Sci. Eng (2006) pp. 101-109, vol. 129(1).

Beuth, J. et al., "The Role of process variables in laser-based direct metal solid freeform fabrication", N. JOM (2001) pp. 36-39, vol. 53.

Stiltner, Justin L. et al., "A Method for Creating Actuated Joints via Fiber Embedding in a Polyjet 3D Printing Process", 22nd Annual International Solid Freeform Fabrication Symposium, 2011.

Ge, Qi et al., "Active materials by four-dimension printing," cited as Applied Physics Letters (2013) pp. 131901, vol. 103.

Wool, Richard P., "Self-healing Materials: a Review", Soft Matter, 2008 pp. 400-418, vol. 4.

Liu, Ying et al., "Self-folding of Polymer Sheets Using Local Light Absorption", Soft Matter Feb. 14, 2012, pp. 1764-1769, vol. 8, No. 6.

Seufzer, William J., "Additive Manufacturing Modeling and Simulation", NASA/TM—2014—218245, Apr. 2014.

Beuth, Jack and Klingbeil, "The Role of Process Variables in Laser-Based Direct Metal Solid Freeform Fabrication", JOM, Sep. 2001, pp. 36-39.

\* cited by examiner

DEVICES AND METHODS FOR ADDITIVE MANUFACTURING USING FLEXIBLE FILAMENTS

CROSS-REFERENCE TO RELATED PATENT APPLICATIONS

This patent application claims the benefit of and priority to U.S. Provisional Patent Application No. 62/294,499, filed on Feb. 12, 2016, titled "DEVICES AND METHODS FOR ADDITIVE MANUFACTURING USING FLEXIBLE FILAMENTS," and U.S. Provisional Patent Application No. 62/252,825, filed on Nov. 9, 2015, titled "DEVICES AND METHODS FOR ADDITIVE MANUFACTURING USING FLEXIBLE FILAMENTS," the entire contents of each application is hereby incorporated by reference in its entirety.

STATEMENT REGARDING FEDERALLY SPONSORED RESEARCH OR DEVELOPMENT

The invention described herein was made in the performance of work under NASA contracts and by employees of the United States Government and is subject to the provisions of the National Aeronautics and Space Act, Public Law 111-314, § 3 (124 Stat. 3330, 51 U.S.C. Chapter 201) and 35 U.S.C. § 202, and may be manufactured and used by or for the Government for governmental purposes without the payment of any royalties thereon or therefore. In accordance with 35 U.S.C. § 202, the contractor elected not to retain title.

FIELD OF THE INVENTION

The present invention relates to the use of an additive manufacturing process to build parts using flexible filaments. More particularly, it relates to a method for printing filaments having material properties that do not permit effective extrusion using compressive force.

BACKGROUND OF THE INVENTION

Various processes for fabricating polymer components have been developed. For example, Fused Deposition Modeling (FDM), generically called Fused Filament Fabrication (FFF), is a fabrication method ("3D printing") that may involve heating and extruding polymeric filaments (e.g. thermoplastics) to produce 3D components.

Various methods for processing continuous and discontinuous wires and fibers as well as fiber reinforced filaments have also been disclosed. Wicker et. al. (US 20140268604) discloses methods for embedding wires and mesh into a 3D printed structure. Mark et. al. (US 20150108677) discloses methods for 3D printing continuous and semi-continuous reinforced fiber filaments. Jang et. al. (U.S. Pat. No. 6,934,600 B2) discloses methods for manufacturing and printing continuous nanomaterial reinforced filaments. Batchelder et. al. (U.S. Pat. No. 8,221,669 B2) discloses the use of asymmetrical filaments for 3D printing. Kappesser et. al. (US 20130233471) discloses a fiber placement system for small flat laminates. Tyler et. al. (US 20140061974) discloses 3D printing using continuous fiber filaments. Hoagland, Abraham (US 17835) which describes a device for holding proper tension on thread in a sewing machine. However, known processes may suffer from various drawbacks.

BRIEF SUMMARY OF THE INVENTION

As noted above, additive manufacturing methods such as Fused Filament Fabrication (FFF) involve extruding, a feedstock material from a nozzle via a compressive force applied to the feedstock. However, the compressive forces may cause buckling of the filament. Thus, in known FFF processes the feedstock material must be of sufficient size and stiffness to undergo the required compression without buckling.

However, filaments having small filament diameters and/or filaments comprising highly conformable (flexible) materials (e.g. CNT yarns), may not have sufficient size and stiffness to permit extrusion in FFF processes. Processes for printing small diameter/flexible filaments/materials have been developed. For example, Jang et. al U.S. Pat. No. 6,934,600 presents a method for printing CNT materials within a matrix. However the total CNT content (<50% wt.) of the materials utilized in the Jang '600 process is significantly lower than required for some applications, especially those requiring high performance components (e.g. aerospace applications). Kappesser et. al. U.S. 20130233471 also demonstrates a method for placing small diameter/flexible materials. However, the method of Kappesser does not provide for printing of small features, especially features that are on the order of 100 microns.

In some cases, constraining the sides of a flexible filament may be sufficient to prevent buckling. This is not always practical given the design requirements of a 3D printing system such as filament size, print temperature, and machining constraints. In particular, constraining the sides of a flexible filament may not be viable for highly flexible, continuous thin nanotube yarn based filaments.

One aspect of the present disclosure is a process that reduces or eliminates buckling by printing filament without applying a compressive force on the material. A process and system according to one aspect of the present disclosure allows a feedstock material to be printed while maintaining a tension force of greater than or equal to zero in the feedstock throughout the extrusion system. The present disclosure also provides a method for printing continuous filaments which are capable of carrying very little or no axial compressive load. The present disclosure enables enhanced filament-substrate adhesion in specific areas along the printed part to facilitate printing. Another aspect of the present disclosure is a method for printing flexible continuous filaments in which an additional compaction force can be applied on the filament after printing. Yet another aspect of the present disclosure is a method for printing flexible continuous filaments in which enhanced filament-substrate adhesion can be achieved throughout the entire printed element. The present disclosure further includes a method for creating a machine tool path which identifies areas where additional movements are needed for filament printing.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
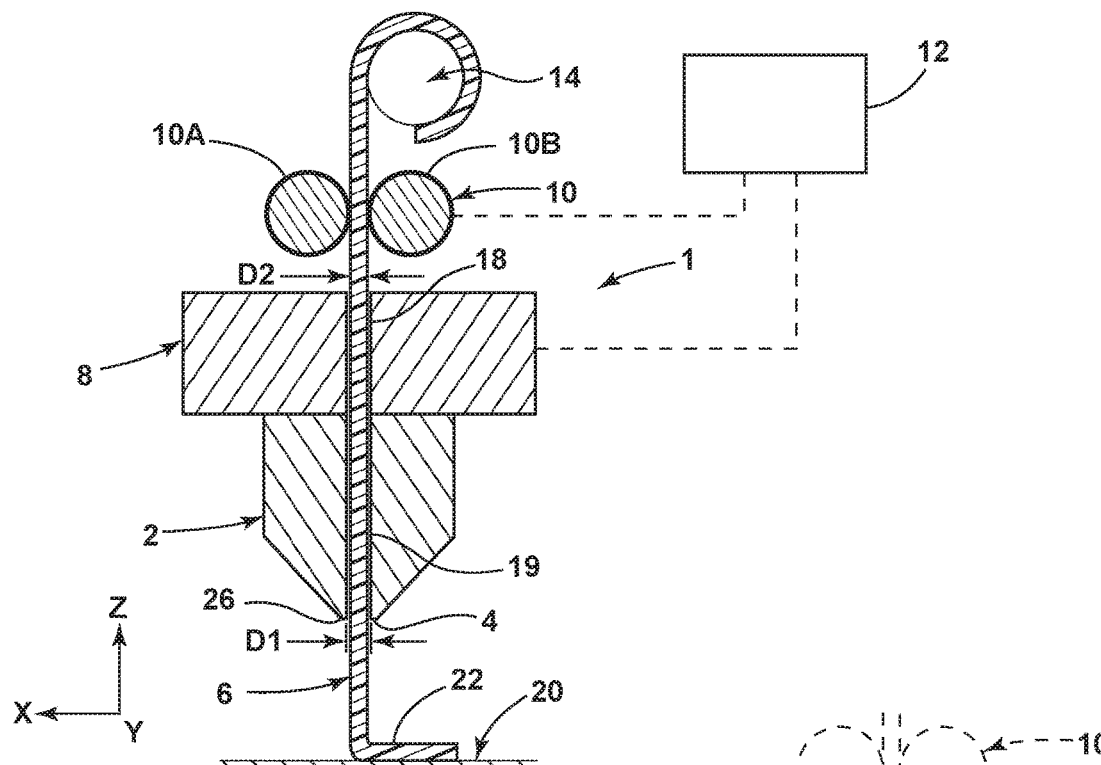
FIG. 1 is a partially fragmentary schematic cross-sectional view of a flexible filament printing device.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
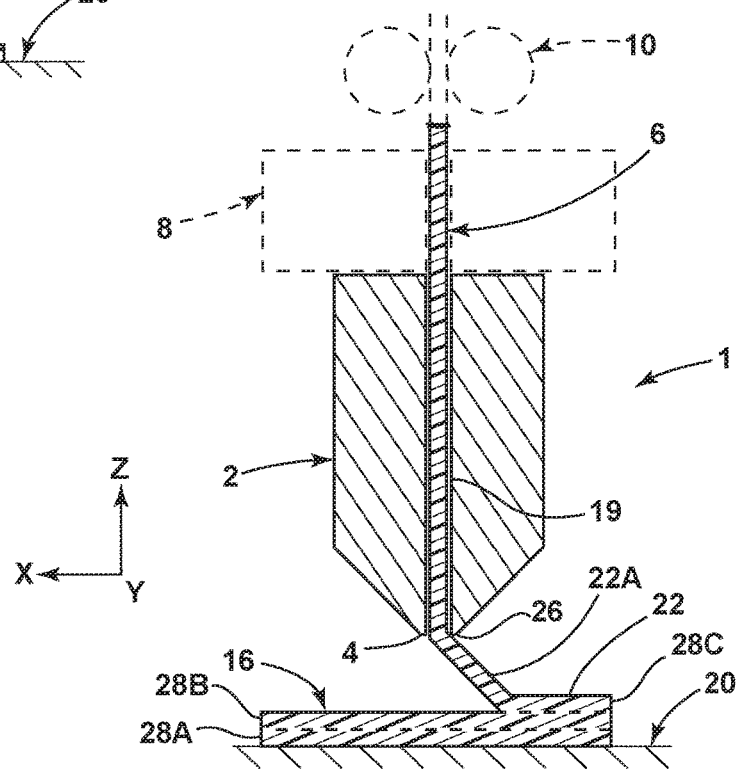
FIG. 2 is a partially fragmentary schematic cross-sectional view showing a flexible filament printing on pre-deposited filament.

With reference to FIGS. 1 and 2, a 3D printing device 1 according to one aspect of the present disclosure includes a nozzle 2 have an outlet opening 4. Outlet opening 4 preferably has a diameter "D1" that is greater than or equal to a diameter "D2" of a thin/flexible filament 6. Filament 6 may comprise a thermoplastic polymer material that softens/melts upon heating nozzle 2 or a thermoset polymer material that cures upon heating nozzle 2. Filament 6 may comprise CNTs and/or other materials in combination with thermoplastic or thermoset polymer materials. As used herein, the term "filament" generally refers to a filament that comprises at least some thermoplastic and/or thermoset polymer material, and may include but is not limited to filaments comprising thermoplastic or thermosetting materials and other materials such as CNTs, CNT yarn, boron nitride nanotubes (BNNTs) and BNNT yarn, silicon carbide (SiC) nanotubes and SiC yarn. An electrical heating element 8 is attached to the nozzle 2 to control the temperature of the nozzle 2 during operation. Heating element 8 is operably connected to controller 12 of 3D printing device 1.

A metering device 10 is located upstream from the heating element 8. Metering device 10 may include electrically-powered rollers 10A and 10B that are selectively actuated by controller 12 to control the direction, speed and length of the filament 6 between the nozzle 2 and metering device 10. The metering device 10 is also used to pull the filament 6 off a filament dispensing unit 14 which holds the filament 6 prior to printing.

Figure 3:
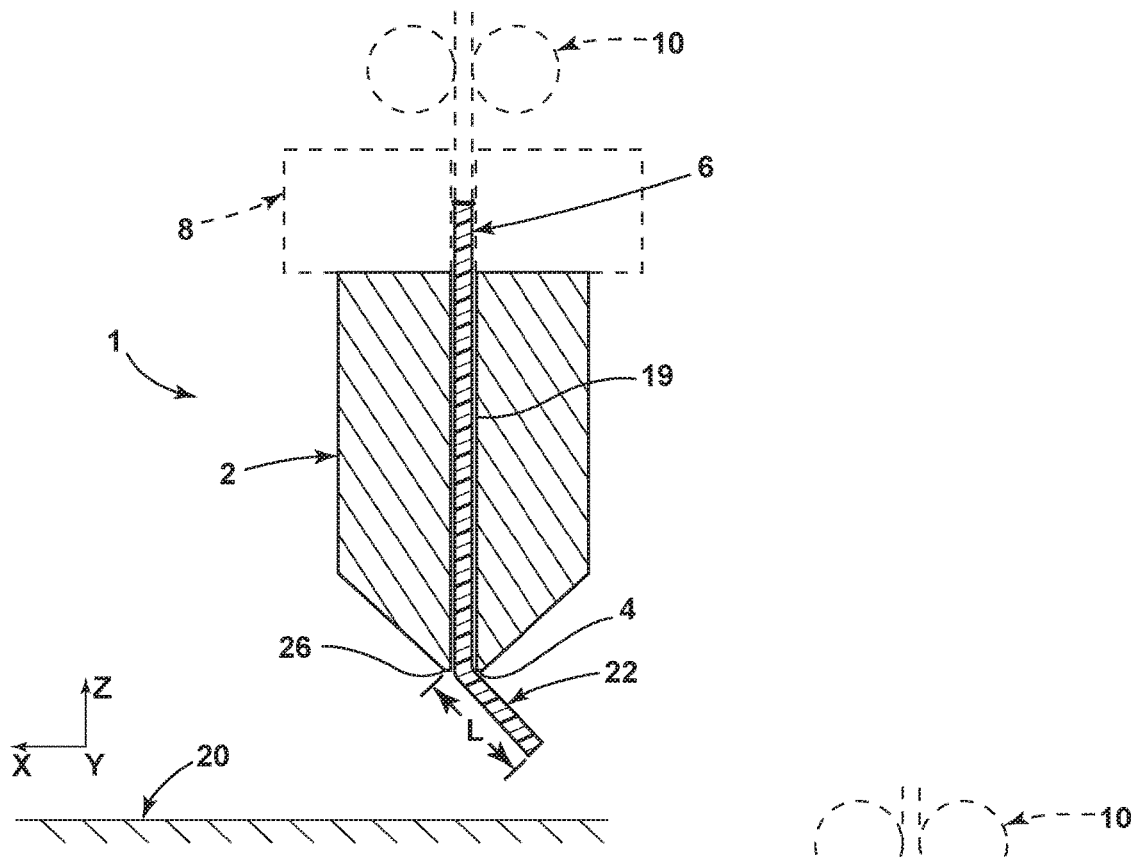
FIG. 3 is a partially fragmentary schematic cross-sectional view of a flexible filament prior to being attached to a substrate.
Figure 4:
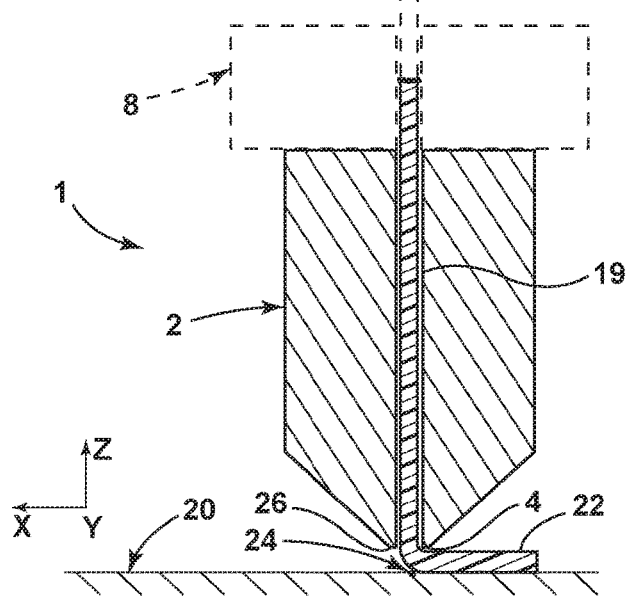
FIG. 4 is a partially fragmentary schematic cross-sectional view showing a filament being held at a substrate surface.

Printing can be performed onto a substrate 20 and/or onto previously deposited material 16 (FIG. 2). Filament 6 is loaded into the 3D printing device 1 by threading the filament 6 through the metering device 10, passageway 18A, heating element 8, and nozzle 2 so that a short end portion 22 (FIG. 3) of filament 6 having a length "L" extends from the nozzle outlet 4. Controller 12 then actuates heating element 8 to heat the nozzle 2 to a temperature above the melting point of the feedstock material, the substrate material, or both. Once the nozzle 2 is at the desired temperature, the end portion 22 of filament 6 is anchored to the substrate 20 as shown in FIG. 4. During anchoring, the nozzle 2 is moved towards the substrate 20 in a negative Z-direction while simultaneously tracking along the substrate surface 20 in the X-direction until the end portion 22 of filament material 6 is sandwiched/clamped between lower end 26 of the nozzle 22 and substrate material 20 at a starting point 24. Lower end 26 of nozzle 2 and substrate 20 may be in contact. The end portion 22 of filament 6 is held in the clamped position (FIG. 4) for a predetermined duration greater than or equal to zero seconds to allow for adhesion of the end portion 22 of filament 6 to the substrate 20. Nozzle 2 may heat filament 6 to a molten or partially molten state, such that filament 6 adheres to substrate 20 as filament 6 cools and solidifies.

Figure 5:
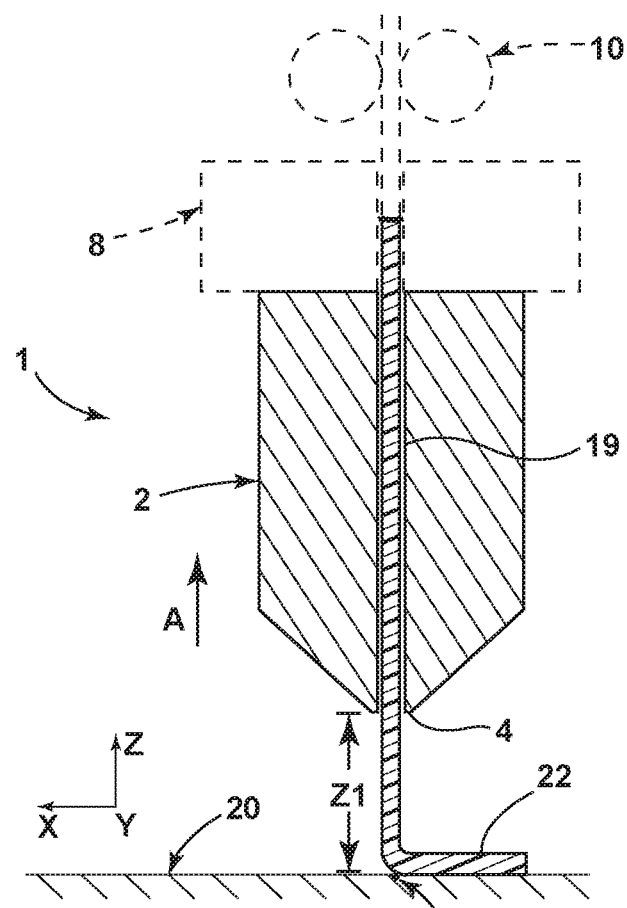
FIG. 5 is a partially fragmentary schematic cross-sectional view showing a nozzle that has been retracted away from a substrate surface.

To begin printing additional filament, the nozzle 2 is moved upwardly away from the substrate 20 for a short distance Z1 (FIG. 5). Distance Z1 may vary as required for a particular application. During movement of nozzle 2 from the position of FIG. 4 to the position of FIG. 5, the metering device 10 extrudes a material length equal to the tool path length (distance Z1) to ensure that tension in the filament 6 between the metering device 10 and the nozzle 2 remains at or near zero.

Figure 6:
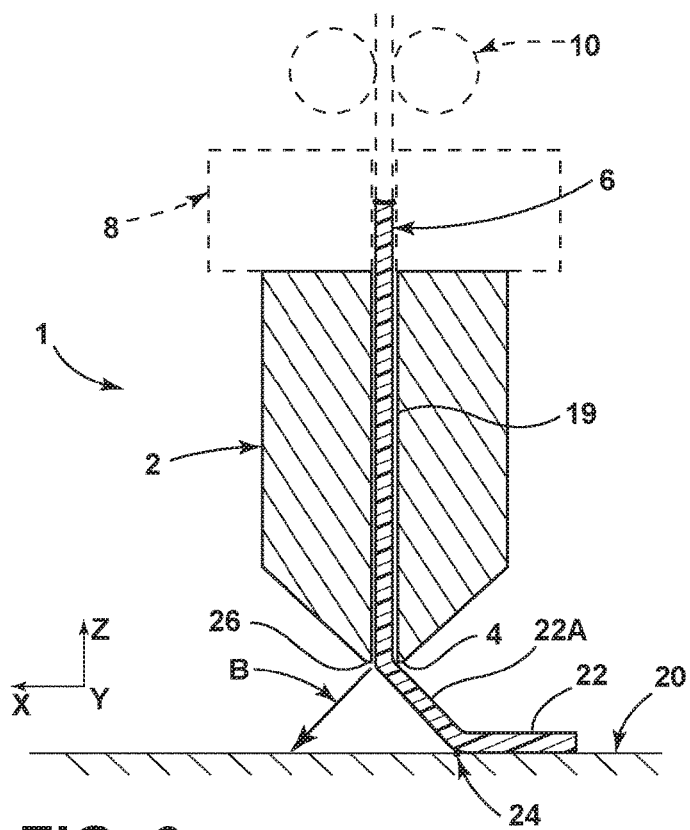
FIG. 6 is a partially fragmentary schematic cross-sectional view showing the nozzle moved back towards the substrate surface.
Figure 7:
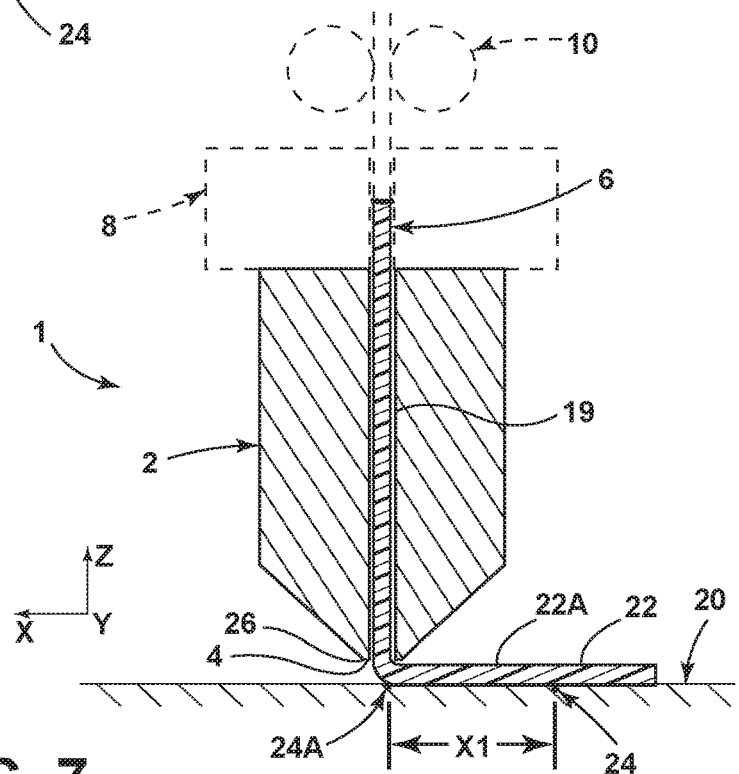
FIG. 7 is a partially fragmentary schematic cross-sectional view of a filament being held between a nozzle and a substrate surface.

With further reference to FIGS. 6 and 7, a linear movement of the nozzle 2 in an angled direction (arrow B) is then performed to bring adjacent end portion 22A the filament material 6 in contact with the substrate 20 at a predetermined location 24A at a distance X1 from the last contact point 24. The direction of movement (arrow B) is between 0° and 90° relative to the X axis, and more preferably between about 30° and 60° (e.g. 45°). During movement of nozzle 2 from the position of FIG. 6 to the position of FIG. 7, the metering device 10 extrudes or retracts filament material as required to ensure that the total length of filament material 6 extruded between the first and second contact points 24 and 24A, respectively is equal to the linear distance X1 between these two points. The filament is then held in the position of FIG. 7 for a predetermined duration of time greater than or equal to zero seconds to allow for adhesion of the end portion 22A of filament 6 to the substrate material. Once a single trace of filament 6 has finished printing, it is cut so that a small length L (FIG. 3) of filament 6 extends from the outlet 4 of the nozzle 2 for the next print run. Filament printing continues by repeating this process as many times as necessary to build up the required number of layers 28A, 28B, etc. (FIG. 2). It will be understood that the matrix material of layers 28A, 28B, etc. of a final component preferably bond and/or flow (melt) together to form a substantially continuous matrix that does not include seams or boundaries between the layers 28A, 28B, etc.

Figure 8:
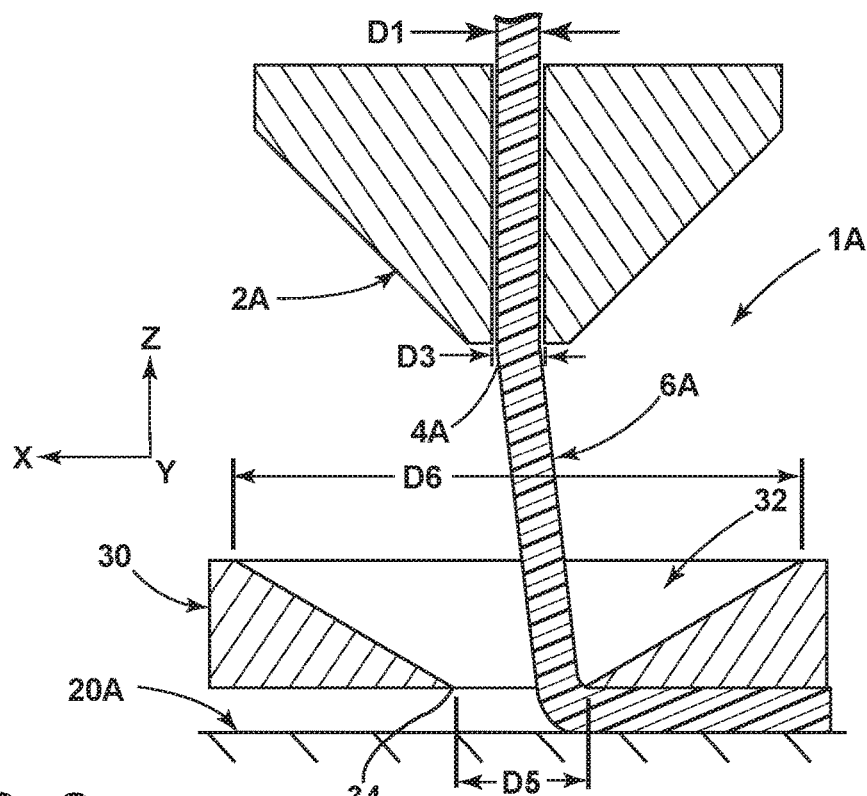
FIG. 8 is a partially fragmentary schematic cross-sectional view showing a nozzle and a compaction foot.

With further reference to FIG. 8, a 3D printing device 1A according to another aspect of the present disclosure includes a nozzle 2A having an outlet opening 4A having a diameter D3 that is preferably greater than or equal to a diameter D1 of filament 6A. Device 1A includes a compaction foot 30 in the form of a flat plate that may include a countersunk (conical) aperture or hole 32. Hole 32 has a minimum diameter D5 and a maximum diameter D6. The minimum diameter D5 is preferably at least somewhat greater than the diameter D1 of the filament 6A. The hole 32 preferably includes a beveled or rounded edge 34 at the bottom of the plate 30. Device 1A may be configured such that nozzle outlet 4A and hole 32 in the flat plate 32 are concentric, with the larger diameter D6 of the hole 32 in the flat plate 30 facing the nozzle outlet 4A. Alternatively, diameter D6 of hole 32 may be offset in the X-direction slightly relative to outlet 4A of nozzle 2A. As discussed below in connection with FIG. 9, plate 30 may be shifted downwardly to clamp an end portion 36 of filament 6A against substrate 20A. The configuration of hole 32 allows for clamping compaction to take place regardless of the printing direction (i.e. regardless of the direction of movement of nozzle 2A in the X-Y plane relative to substrate 20A).

Figure 9:
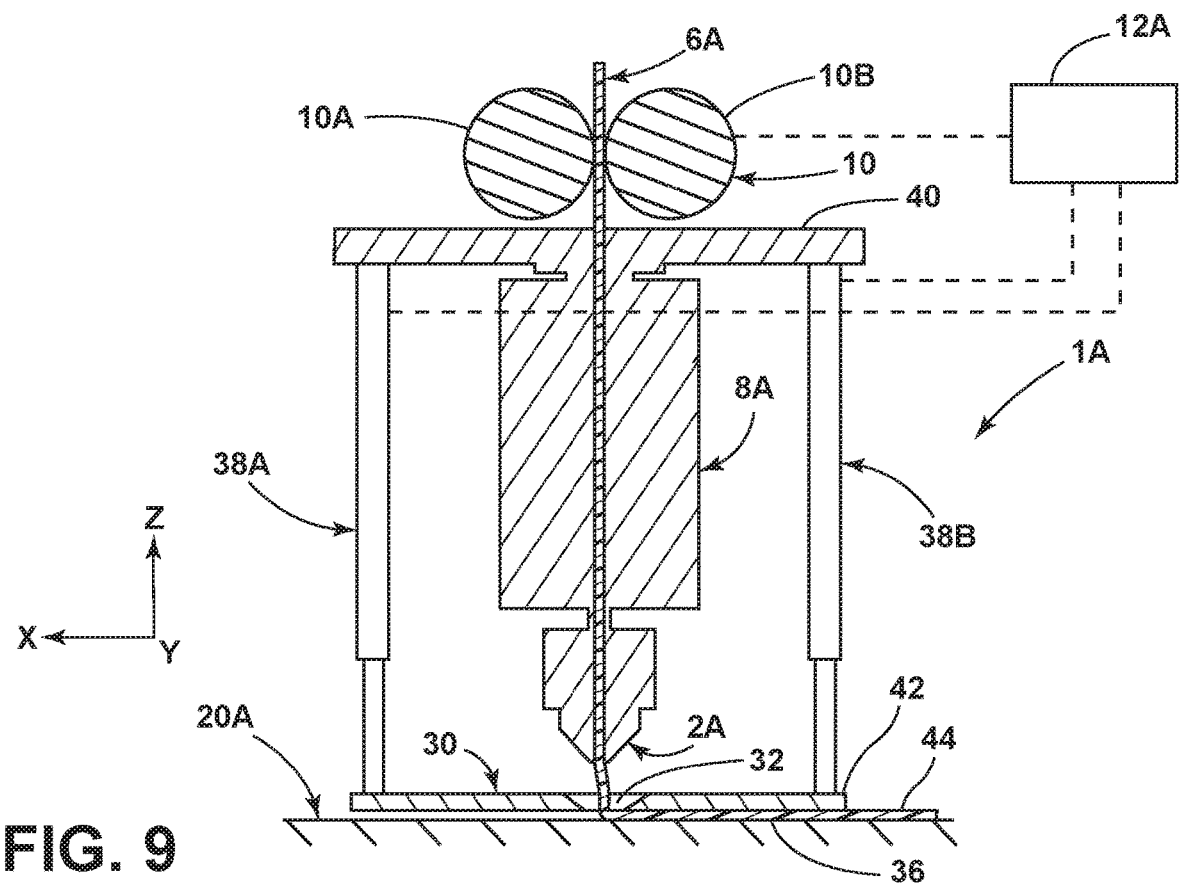
FIG. 9 is a partially fragmentary schematic cross-sectional view of the compaction foot and a linear actuator.

With further reference to FIG. 9, the configuration of nozzle 2A and the plate 30 permits these components to move linearly relative to each other along the Z axis perpendicular to the flat plate 30. Nozzle 2A and plate 32 can be moved relative to one another in the Z-direction utilizing either passive or active linear devices such as powered actuators 38A and 38B. Nozzle 2A may be mounted to an upper plate 40, and plate 30 may be mounted to lower plate 42. The powered actuators 38A and 38B may be operably connected to upper and lower plates 40 and 42, respectively. Device 1A may include a controller 12A that selectively actuates powered actuators 38A and 38B to clamp an end portion 44 of filament 6A against substrate 20A in a manner that is similar to the process described above in connection with FIGS. 1-7. Although actuators 38A and 38B are preferably powered actuators (e.g. electrically-powered linear actuators), actuators 38A and 38B may alternatively comprise passive devices (e.g. spring-biased cylinders). The compaction/clamping force on the substrate 20A is adjustable and controllable for both passive or active linear devices.

Figure 10:
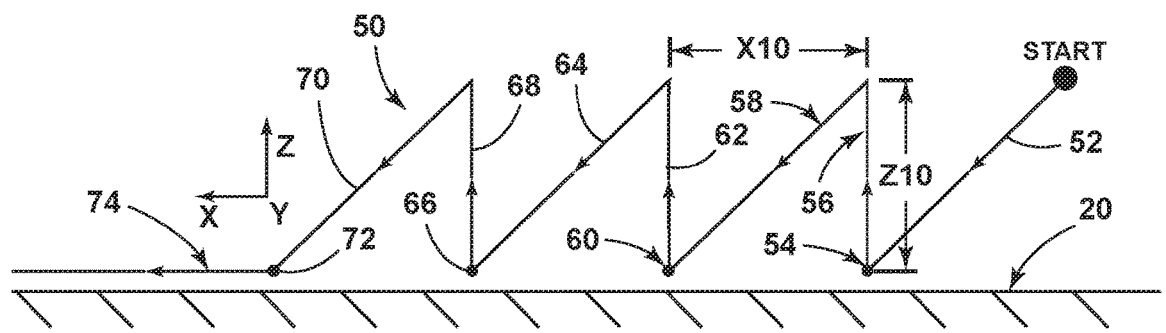
FIG. 10 is a schematic representation of a tool path used for adhesion enhancement of filament in select areas.

FIG. 10 shows a tool path 50 for a process/method according to the present disclosure wherein the adhesion between the filament 6 and substrate 20 is enhanced in selected areas. In this method, once the filament 6 has been anchored to the substrate 20 at a first point 54, the nozzle 2 is then retracted perpendicular to the substrate 20 for a short distance 56 in the Z direction. During this movement, the metering device 10 extrudes a material length equal to the tool path length Z10 along path segment 56 to ensure that tension in the filament 6 between the metering device 10 and the nozzle 2 remains zero or approximately zero. A linear movement 58 of nozzle 2 is then performed to again bring the filament material 6 into contact with the substrate 20 at a predetermined location 60 that is a horizontal distance X10 from the prior contact point 54. The metering device 10 extrudes and/or retracts the filament material 6 to ensure that the total length of material extruded between the first and second contact points 54 and 60 is substantially equal to the linear distance (i.e. the sum of path segments 56 and 58) between points 54 and 60. The filament 6 is then held in position at point 60 for a predetermined duration greater than or equal to zero seconds to allow for adhesion of the filament 6 to the substrate 20 at point 60. This process is repeated as many times as necessary as shown by path segments 62, 64, 68, 70 and contact points 66, 72, etc. to ensure that the bond between filament 6 and substrate 20 is consistent with design or printing requirements. After the final contact point 72, the nozzle 2 is moved across the surface of the substrate 20 at the same height (e.g. in the X direction). As nozzle 2 moves relative to substrate 20, the filament material 6 is pulled out of the nozzle 2 under tension. Tension on filament 6 is created due to friction between the nozzle 2 and filament 6 and the reinforced filament substrate bond 74. Once a single trace of filament 6 has finished printing, the trace of filament 6 may be cut so that a small length of filament (e.g. end portion 22, FIG. 3) extends from the outlet 4 of the nozzle 2. This process can be used in corners and other areas where sharp runs with a small radius (e.g. >>1 inch) are required.

In the process of FIG. 10, the line segments 56, 62, 68 of the tool path 50 are substantially perpendicular to substrate 20, and the angled line segments 58, 64, 70 extend at an angle of about 45° relative to substrate 20. Also, the vertical distance Z10 may be about 0.0625 to about 0.25 inches, and the horizontal distance X10 may be about 0.0625 to about 0.25 inches. However, it will be understood that the angles and lengths of the path segments may vary as required for a particular material and/or application.

Figure 11:
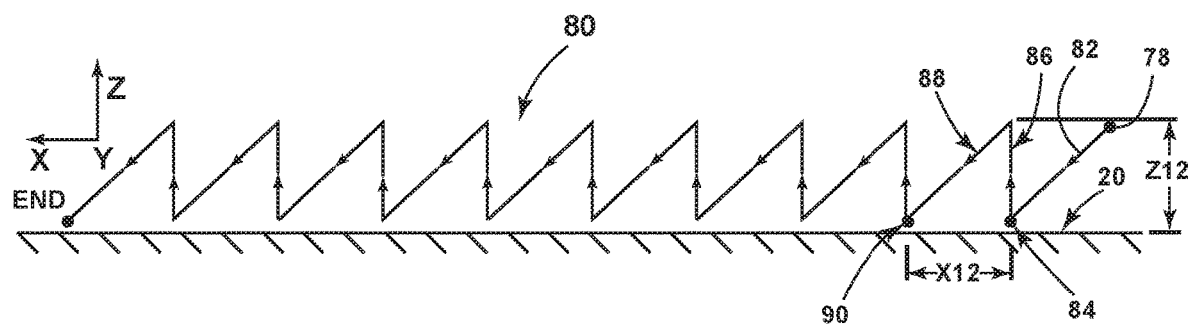
FIG. 11 is a schematic representation of a tool path used for adhesion enhancement over the entire length of a filament.

With further reference to FIG. 11, a tool path 80 for a method/process according to another aspect of the present disclosure provides for improved adhesion between filament 6 and substrate 20 along substantially the entire length of a printed filament 6. In this method, after moving from a START location (e.g. point 78) along an angled path segment 82, the filament 6 is then anchored to the substrate 20 at a point 84. The nozzle 2 is then retracted perpendicular to the substrate in a Z direction for a short distance Z12 along path segment 86. During this movement, the metering device 10 extrudes a length of filament 6 that is substantially equal to the length of path segment 86 to ensure that the tension in the filament 6 between the metering device 10 and the nozzle 2 remains at or near zero. A linear move along an angled path segment 88 is then performed to again bring the filament material 6 into contact with the substrate 20 at a predetermined location 90 at a horizontal distance X12 from the prior contact point 84. The metering device 10 extrudes or retracts filament material 6 to ensure that the total length of filament material 6 extruded between the first and second contact points 84 and 90 is substantially equal to the linear distance between these two points (i.e. the sum of the lengths of path segments 86 and 88). The filament 6 is then held in this position (point 90) for a predetermined duration greater than or equal to zero seconds to allow for adhesion of the filament 6 to the substrate material 20. This process is repeated at a series of points along the printed filament tool path 80 to enhance adhesion between the filament 6 and substrate material 20. Once a single trace of filament 6 has finished printing, it may be cut so that a small length of filament extends from the outlet 4 of the nozzle 2.

Distance Z12 may be about 0.0625 to about 0.25 inches, and distance X12 may be about 0.0625 to about 0.25 inches. Line segments 88 are preferably about 45° relative to substrate 20. However, the length and angles of line segments 86 and/or 88 may be varied as required for a particular application.

Figure 12:
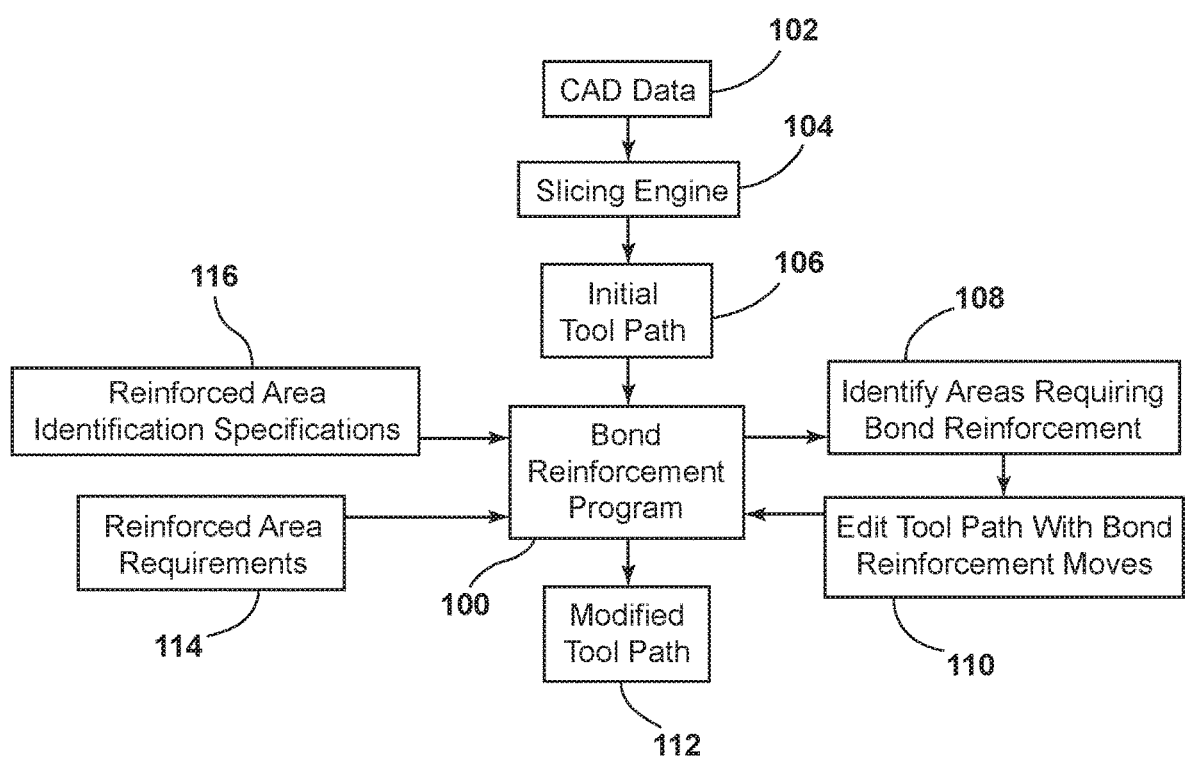
FIG. 12 is a block diagram of an automated tool for modifying tool path commands.

With further reference to FIG. 12, the embodiments of the present disclosure may be implemented utilizing an automated process (tool) for determining locations in a printed filament where bonding reinforcement is necessary and adding the required movements to the tool path to affect the reinforcement. An initial filament printing tool path 106 is produced utilizing 3D CAD data 102 for a part to be fabricated. CAD data 102 is supplied to a slicing engine 104 that outputs the initial tool path 106. Initial tool path data 106 comprising at least two points (e.g. points 54, 72, FIG. 10) and a printing direction is supplied to the bond reinforcement program 100. Additionally, a user also supplies specifications 116 for areas of the print that will require additional compactions. These specifications include (but are not limited to) the length of filament 6 to be printed between two turns, the radius of the turn, and the speed of the print (e.g. speed of nozzle 2 relative to substrate 20). The user may also supply information 114 on how bond reinforcement is to be performed, including nozzle temperature, duration on compaction at a point, compaction force applied, etc. The bond reinforcement program 100 then analyzes the filament printing tool path to identify areas (e.g. points in X, Y, Z coordinates) where bond reinforcement is needed as shown at 108 based on the user-supplied data 114 and 116. At these points, addition commands are automatically inserted into the tool path to perform the bonding reinforcement process according to modified tool path 112. Additional moves or commands may be added to enable printing with a compaction foot 30 (FIGS. 8 and 9). The automated tool inserts additional commands such as cutting commands in required areas, and commands to ensure that a length of material (e.g. end 22, FIG. 3) is left extending from the nozzle 2 after cutting to allow printing to resume. If desired, the user can manually adjust the tool path to correct any issues.

It is to be understood that variations and modifications can be made on the aforementioned structure without departing from the concepts of the present invention, and further it is to be understood that such concepts are intended to be covered by the following claims unless these claims by their language expressly state otherwise.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A method of depositing flexible filament onto a substrate to form objects, the method comprising:
   threading a flexible filament through a passageway in a heating element and through a passageway in a nozzle, wherein the flexible filament is unconstrained between a metering device and the heating element, the heating element being disposed between the nozzle and the metering device such that the flexible filament is threaded through the passageway in the heating element before being threaded through the passageway in the nozzle;
   extending a first portion of the flexible filament from the nozzle through an opening in a compaction foot disposed between the nozzle and the substrate, wherein the compaction foot is configured to move vertically independent of the nozzle and the opening in the compaction foot is a conical hole having its larger diameter opening at a side of the compaction foot facing the nozzle and its smaller diameter opening at a side of the compaction foot facing the substrate;
   with the heating element, heating the nozzle to a temperature that permits the flexible filament to be bonded to the substrate;
   with one or more actuators, creating relative vertical motion between the nozzle and the compaction foot to bring the first portion of the flexible filament into contact with the substrate;
   retaining the first portion of the flexible filament in contact with the substrate until the first portion of the flexible filament adheres to the substrate; and
   moving the nozzle relative to the substrate with the flexible filament in tension.

2. The method of claim 1, wherein:
   the flexible filament is incapable of carrying an axial compressive load without buckling.

3. The method of claim 2, wherein:
   the flexible filament comprises a thermoplastic polymer material; and including:
   partially or fully melting the thermoplastic polymer material to form a part having a shape; and;
   cooling the thermoplastic polymer material such that the part maintains the shape.

4. The method of claim 2, wherein:
   the flexible filament initially comprises a partially cured thermoset polymer material; and including:
   depositing the thermoset polymer material to form a part having a shape; and:
   curing the thermoset polymer material to maintain the shape of the part.

5. The method of claim 1, wherein:
the flexible filament comprises a continuous carbon nanotube yarn or fiber.

6. The method of claim 1, wherein:
the flexible filament comprises a polymeric material, a continuous carbon nanotube yarn or fiber, and a doping material that modifies at least one of the thermal, electrical, and/or structural properties of the polymeric material.

7. The method of claim 6, wherein:
the doping material is selected from the group consisting of chopped fibers, nanotubes, nanosheets and metal powders.

8. The method of claim 1, wherein:
the flexible filament comprises continuous yarn or fiber infused with a thermoplastic polymer material or a partially cured thermoset polymer material.

9. The method of claim 1, including:
utilizing the metering device to control tension in the flexible filament.

10. The method of claim 9, including:
moving the compaction foot relative to the nozzle and the substrate to apply a compaction force on the flexible filament, wherein the conical hole is beveled at an edge at the side of the compaction foot facing the substrate.

11. The method of claim 1, wherein:
tension in the flexible filament is greater than or equal to zero.

12. The method of claim 1, wherein:
the flexible filament and substrate bond is enhanced in at least one selected area by adhering the flexible filament to the substrate at more closely-spaced locations in the at least one selected area than in an at least one other area that is outside the at least one selected area.

13. The method of claim 1, wherein:
the flexible filament is heated to a higher temperature in at least a first selected area relative to a second area outside the first selected area to provide increased bond strength in the first selected area relative to the second area.

14. The method of claim 13, including:
configuring a processor to execute an algorithm to determine areas where additional bond reinforcement is required utilizing data that is supplied by a user.

15. The method of claim 1, wherein:
the bond between the flexible filament and substrate is enhanced over the entire printed length of the flexible filament by adhering the flexible filament to the substrate at closely-spaced locations over the entire length of the flexible filament.

16. The method of claim 1, including:
utilizing the compaction foot to clamp the first portion of the flexible filament to the substrate,
wherein:
the compaction foot comprises a flat plate extending radially from the conical hole perpendicular to the substrate and farther than a diameter of the nozzle; and
the compaction foot is configured such that the flat plate allows for clamping compaction of the flexible filament regardless of a direction of movement of the nozzle.

17. The method of claim 1, including:
determining locations on a part to be printed that require additional bond reinforcement prior to depositing the flexible filament on the substrate.

18. The method of claim 1, including:
utilizing three dimensional computer aided design data concerning a part to produce a tool path comprising a plurality of anchor points at which the flexible filament is bonded to the substrate.

19. The method of claim 1, including:
causing the nozzle to travel along a tool path that includes a plurality of segments in which the nozzle moves towards the substrate, and a plurality of segments in which the nozzle moves away from the substrate.

* * * * *